(12) United States Patent
Krichevsky et al.

(10) Patent No.: US 9,064,525 B2
(45) Date of Patent: Jun. 23, 2015

(54) DISK DRIVE COMPRISING LASER TRANSMISSION LINE OPTIMIZED FOR HEAT ASSISTED MAGNETIC RECORDING

(71) Applicant: Western Digital Technologies, Inc., Irvine, CA (US)

(72) Inventors: Alexander Krichevsky, San Jose, CA (US); Robert J. Johnson, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/091,098

(22) Filed: Nov. 26, 2013

(65) Prior Publication Data

US 2015/0146506 A1    May 28, 2015

(51) Int. Cl.
*G11B 11/00*    (2006.01)
*G11B 13/04*    (2006.01)

(52) U.S. Cl.
CPC ...................................... *G11B 13/04* (2013.01)

(58) Field of Classification Search
CPC .............................................. G11B 2005/0032
USPC ...................... 369/13.26, 13.24, 13.33, 13.13
See application file for complete search history.

(56) References Cited

U.S. PATENT DOCUMENTS

| | | | |
|---|---|---|---|
| 4,485,361 A | 11/1984 | Bender | |
| 5,065,226 A | 11/1991 | Kluitmans et al. | |
| 5,184,095 A | 2/1993 | Hanz et al. | |
| 5,194,979 A | 3/1993 | Koai et al. | |
| 5,521,933 A | 5/1996 | Sosa | |
| 5,717,547 A | 2/1998 | Young | |
| 5,737,152 A | 4/1998 | Balakrishnan | |
| 5,995,328 A | 11/1999 | Balakrishnan | |
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |

(Continued)

OTHER PUBLICATIONS

Paul Meyer, "Pulse Testing of Laser Diodes", https://www.keithley.co.uk/com/applications/research/optoelectronics/focus/laserdiode, Publication Date: Unknown.

(Continued)

*Primary Examiner* — Tan X Dinh

(57) ABSTRACT

A disk drive is disclosed comprising a disk and a head comprising a laser configured to heat the disk while writing to the disk. At least one transmission line couples a laser driver to the laser. Data is written to the disk by pulsing the laser driver, wherein the transmission line comprises an impedance that results in a target pulse shape of optical power output by the laser.

24 Claims, 5 Drawing Sheets

(56) References Cited

U.S. PATENT DOCUMENTS

| | | |
|---|---|---|
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,542,008 B1 | 4/2003 | Daugherty et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,762,913 B1 | 7/2004 | Even et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,801,240 B2 | 10/2004 | Abe et al. |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,941,080 B2 | 9/2005 | Kasper et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,989,550 B2 | 1/2006 | Nakahara et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |

(56) References Cited

U.S. PATENT DOCUMENTS

| | | |
|---|---|---|
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,558 B2 | 4/2006 | Tanbakuchi |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,344 B1 * | 5/2006 | Nguyen ............ 372/38.02 |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,130,100 B2 | 10/2006 | Kagaya et al. |
| 7,133,600 B1 | 11/2006 | Boyle |
| 7,136,244 B1 | 11/2006 | Rothberg |
| 7,136,328 B2 | 11/2006 | Miyaoka |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,317,665 B2 | 1/2008 | Watanabe et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,433,602 B2 | 10/2008 | Diaz |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,463,659 B2 | 12/2008 | Go et al. |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,538,978 B2 | 5/2009 | Sato et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |

(56) References Cited

U.S. PATENT DOCUMENTS

| | | |
|---|---|---|
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,131,158 B2 | 3/2012 | Tokita et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,248,732 B2 | 8/2012 | Nishiyama et al. |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,289,821 B1 | 10/2012 | Huber |
| 8,305,705 B1 | 11/2012 | Roohr |
| 8,305,869 B2 | 11/2012 | Kitayama et al. |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,315,128 B1 | 11/2012 | Wilson et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,385,752 B2 | 2/2013 | Tanaka |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,465 B1 | 6/2013 | Adachi et al. |
| 8,462,466 B2 | 6/2013 | Huber |
| 8,467,151 B1 | 6/2013 | Huber |
| 8,483,027 B1 | 7/2013 | Mak et al. |
| 8,488,279 B1 | 7/2013 | Pan et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,537,644 B2 | 9/2013 | Lennard et al. |
| 8,554,741 B1 | 10/2013 | Malina |
| 8,560,759 B1 | 10/2013 | Boyle et al. |
| 8,565,048 B1 * | 10/2013 | Wilson et al. ............ 369/13.26 |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 2004/0105476 A1 | 6/2004 | Wasserbauer |
| 2004/0208207 A1 | 10/2004 | Kasper et al. |
| 2006/0159462 A1 * | 7/2006 | Aronson et al. ............ 398/138 |
| 2007/0206649 A1 * | 9/2007 | Xu et al. ............ 372/38.02 |
| 2009/0052492 A1 * | 2/2009 | Senga et al. ............ 369/121 |
| 2009/0113702 A1 | 5/2009 | Hogg |
| 2010/0306551 A1 | 12/2010 | Meyer et al. |
| 2011/0205861 A1 | 8/2011 | Erden et al. |
| 2011/0226729 A1 | 9/2011 | Hogg |
| 2011/0285473 A1 * | 11/2011 | Hauer et al. ............ 333/33 |
| 2012/0113770 A1 | 5/2012 | Stipe |
| 2012/0159042 A1 | 6/2012 | Lott et al. |
| 2012/0243390 A1 * | 9/2012 | Lennard et al. ............ 369/13.24 |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2013/0076266 A1 * | 3/2013 | Dean et al. ............ 315/307 |
| 2013/0128388 A1 | 5/2013 | Ajioka et al. |
| 2013/0308431 A1 * | 11/2013 | Brenden ............ 369/13.24 |
| 2014/0119164 A1 * | 5/2014 | Wilson et al. ............ 369/13.32 |
| 2014/0301173 A1 * | 10/2014 | Kuehlwein ............ 369/13.26 |

OTHER PUBLICATIONS

Huber, et al., "Advanced Interconnect Design for High Data Rate Perpendicular Magnetic Recording", IEEE Transactions on Magnetics, vol. 44, No. 1, Jan. 2008, pp. 175-180.

Klaasen, et al., "Writing at high data rates", Journal of Applied Physics, vol. 93, No. 10, May 15, 2003, pp. 6450-6452.

(56) References Cited

OTHER PUBLICATIONS

Matthaei, et al., "Microwave Filters, Impedance-Matching Networks, and Coupling Structures", McGraw-Hill, 1964, pp. 965-1000.
Scanlan, et al., "Microwave Allpass Networks—Part I", IEEE Transactions on Microwave Theory and Techniques, vol. 16, No. 2, Feb. 1968, pp. 62-79.
Zhang, et al., "Dual-Band Microstrip Bandpass Filter Using Stepped-Impedance Resonators With New Coupling Schemes", IEEE Transactions on Microwave Theory and Techniques, vol. 54, No. 10, Oct. 2006, pp. 3779-3785.
U.S. Appl. No. 13/870,931, dated Apr. 25, 2013, to William D. Huber, et al., 21 pages.
U.S. Appl. No. 13/631,493, dated Sep. 28, 2012, to Alexander Krichevsky, et al., 33 pages.
U.S. Appl. No. 14/065,329, dated Oct. 28, 2013, to William D. Huber, 22 pages.
U.S. Appl. No. 13/794,166, dated Mar. 11, 2013, to Alexander Krichevsky, et al., 36 pages.

\* cited by examiner

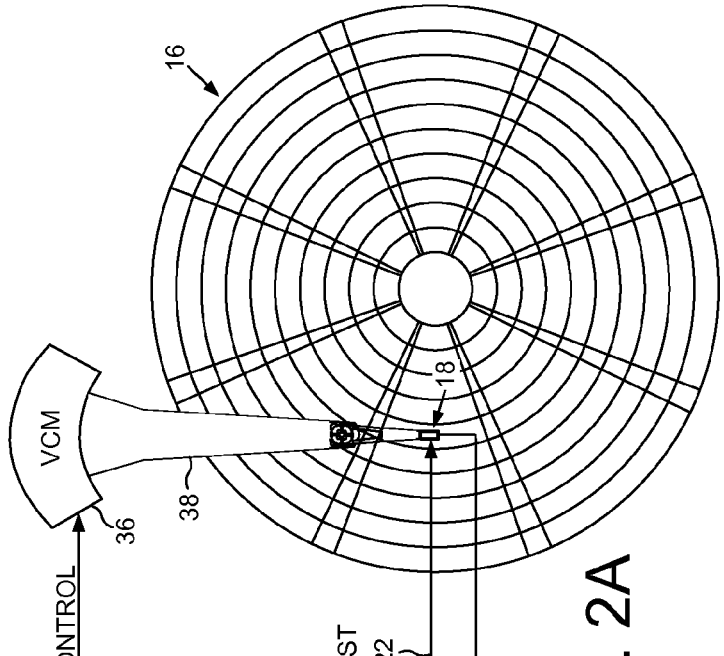
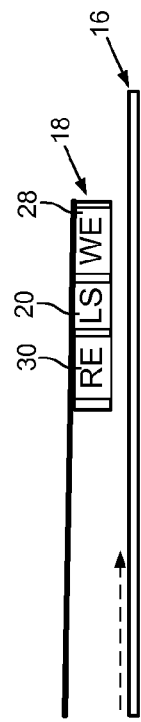
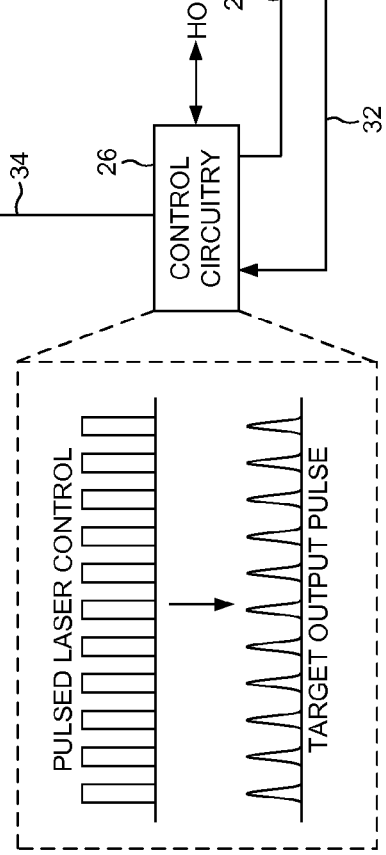
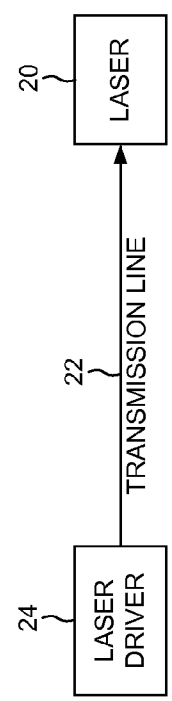
FIG. 2A
FIG. 2B
FIG. 2C
FIG. 2D

DISK DRIVE COMPRISING LASER TRANSMISSION LINE OPTIMIZED FOR HEAT ASSISTED MAGNETIC RECORDING

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector 6, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

Data is typically written to the disk by modulating a write current in an inductive coil to record magnetic transitions onto the disk surface in a process referred to as saturation recording. During readback, the magnetic transitions are sensed by a read element (e.g., a magnetoresistive element) and the resulting read signal demodulated by a suitable read channel. Heat assisted magnetic recording (HAMR) is a recent development that improves the quality of written data by heating the disk surface with a laser during write operations in order to decrease the coercivity of the magnetic medium, thereby enabling the magnetic field generated by the write coil to more readily magnetize the disk surface.

BRIEF DESCRIPTION OF THE DRAWINGS

FIG. 2A shows a disk drive according to an embodiment comprising a disk, a head, and control circuitry.

FIG. 2B shows an embodiment wherein the head comprises a laser configured to heat the disk while writing to the disk.

FIG. 2C shows an embodiment wherein a laser driver is coupled to the laser through a transmission line.

FIG. 2D shows an embodiment wherein the laser driver is pulsed when writing data to the disk, wherein the transmission line comprises an impedance that results in a target pulse shape output by the laser.

DETAILED DESCRIPTION

Figure 1:
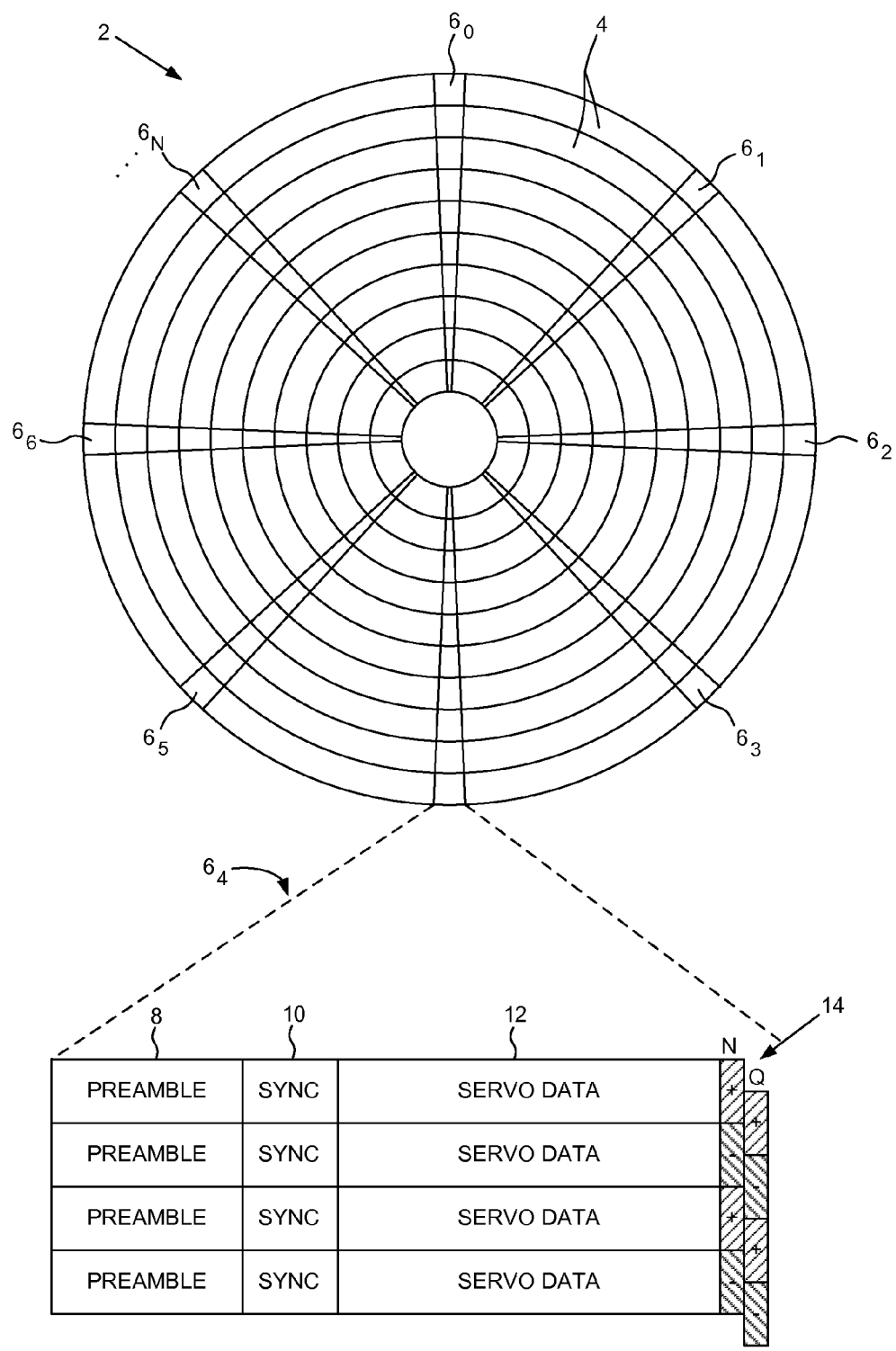
FIG. 1 shows a prior art disk format comprising a plurality of servo tracks defined by servo sectors.

FIG. 2A shows a disk drive according to an embodiment comprising a disk 16, a head 18 comprising a laser 20 (FIG. 2B) configured to heat the disk 16 while writing to the disk 16, and at least one transmission line 22 coupling a laser driver 24 to the laser 20 (FIG. 2C). The disk drive further comprises control circuitry 26 configured to write data to the disk 16 by pulsing the laser driver 24, wherein the transmission line 22 comprises an impedance that results in a target pulse shape output by the laser 20 (FIG. 2D).

The head 18 shown in the embodiment of FIG. 2B comprises a suitable write element 28, such as an inductive coil, for writing data to the disk 16, and a suitable read element 30, such as a magnetoresistive element, for reading data from the disk 16. When accessing the disk 16 during write/read operations, the control circuitry 26 processes a read signal 32 emanating from the read element 30 when reading servo data recorded on the disk 16 (e.g., concentric servo sectors) and demodulates the servo data to generate a position error signal (PES) representing an error between the actual position of the head and a target position relative to a target track. The control circuitry 26 filters the PES using a suitable compensation filter to generate a control signal 34 applied to a voice coil motor (VCM) 36 which rotates an actuator arm 38 about a pivot in order to actuate the head 18 radially over the disk 16 in a direction that reduces the PES. The servo data may comprise any suitable head position information, such as a track address for coarse positioning and servo bursts for fine positioning. The servo bursts may comprise any suitable pattern, such as an amplitude based servo pattern or a phase based servo pattern (FIG. 1).

Any suitable laser 20 may be employed in the embodiment of FIG. 2B, such as a laser diode. In addition, the head 18 may comprise any suitable additional optical components associated with the laser 20, such as a waveguide and a near field transducer (NFT) for focusing the laser light emitted by the laser 20 onto the disk surface. In one embodiment, the laser driver 24 in FIG. 2C adjusts a power applied to the laser 20 over the transmission line 22, such as by adjusting a current or a voltage applied to the laser 20, where the optical power output by the laser 20 is determined in part by the input power applied to the laser 20. In the embodiment of FIG. 2D, the laser driver 24 is pulsed using a suitable duty cycle which may provide various benefits, such as reduced NTF heating, improved thermal gradient which may improve the signal-to-noise ratio (SNR), reduced average laser power which may increase the longevity of the laser, improved laser stability, etc. In one embodiment, the pulse shape of the optical power output by the laser 20 as shown in FIG. 2D depends on the amplitude and duty cycle of the control signal applied to the laser 20, as well as the impedance of the transmission line 22.

In one embodiment, the impedance of the transmission line 22 is based on an amplitude of a current flowing through the laser 20 when pulsing the laser 20. For example, when a high amplitude pulse is applied to the laser 20, it may increase the resulting current flowing through the laser which in turn decreases the impedance of the laser. For a given amplitude and duty cycle of the input pulse applied to the laser 20, a decrease in the transmission line impedance increases the output power of the laser 20 due to the higher ratio between the transmission line impedance and the laser impedance.

Figure 3:
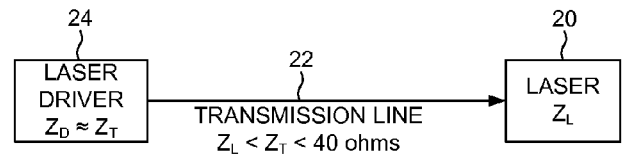
FIG. 3 shows an embodiment wherein the impedance of the transmission line is less than forty ohms and at least ten percent greater than an impedance of the laser.
Figure 4:
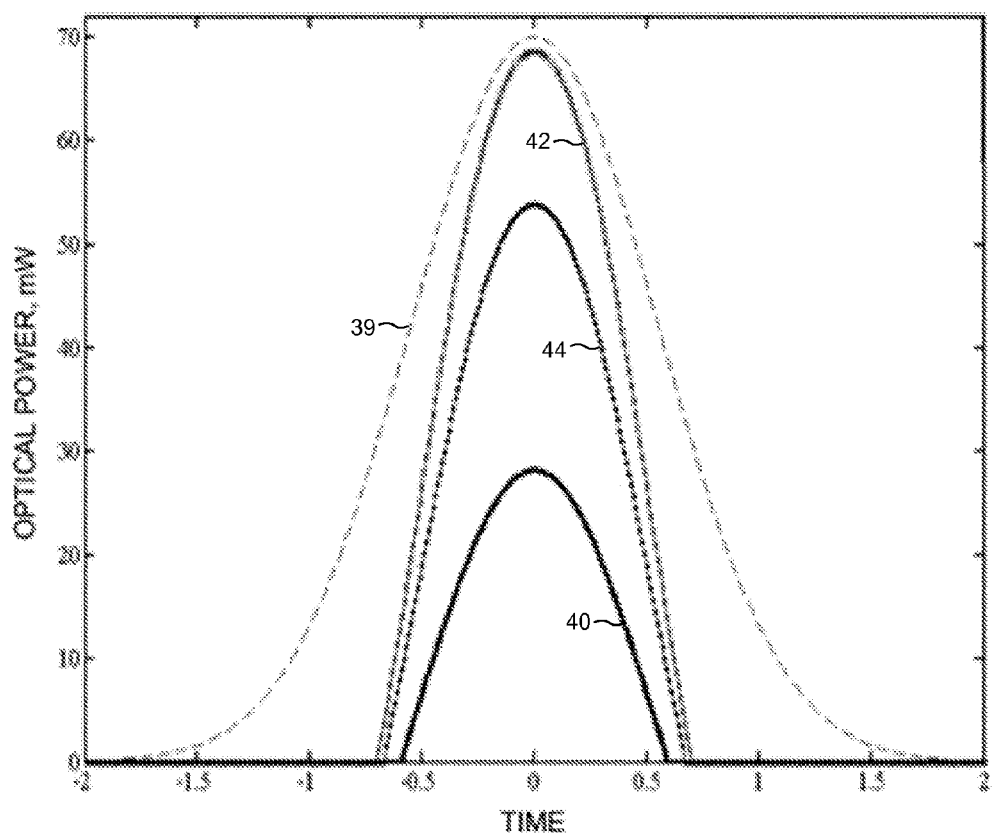
FIG. 4 shows an embodiment wherein the target pulse shape output by the laser corresponds to an impedance of the transmission line being less than forty ohms and at least ten percent greater than an impedance of the laser.

FIG. 4 shows that when applying an input voltage pulse 39, different output pulse shapes of optical power are generated by the laser 20 for different impedance values for the transmission line 22. The smallest output pulse 40 corresponds to a transmission line impedance of greater than forty ohms (e.g., a conventional transmission line may comprise an impedance of fifty ohms). This smaller output pulse may not provide sufficient heating of the disk surface and therefore may reduce the SNR of the resulting read signal. The output pulse may be increased by increasing the input power applied to the laser 20 such as by increasing the amplitude and/or duty cycle of the input pulses shown in FIG. 2D. However, it may be undesirable to increase the input power applied to the laser 20 as it may increase the cost of the power circuitry as well as decrease battery life in portable applications. Accordingly, in one embodiment the output pulse of the laser 20 may be increased without adjusting the input pulse by decreasing the impedance of the transmission line 22. Referring again to FIG. 4, the largest output pulse 42 corresponds to a transmission line impedance that approximately matches an impedance of the laser 20 for the same amplitude and duty cycle of the input pulse. However, this larger output pulse may generate too much optical power which may cause heating degradation of at least one component of the head 18, such as a laser diode or a NFT, and/or it may result in an oversized spot of laser light that heats the disk 16 which may limit the minimum width of the data tracks. Additionally, a smaller output pulse may have a smaller width than a larger output pulse as illustrated in FIG. 4, which may increase the thermal gradient of the disk, thereby enabling higher areal recording densities. Accordingly in one embodiment shown in FIG. 3, the transmission line 22 may be fabricated to comprise an impedance that is less than forty ohms but at least ten percent greater then the impedance of the laser 20. This may result in an optimal output pulse 44 shown in FIG. 4 which may achieve any desirable performance benefit, such as increasing the longevity of the laser components, improving laser stability, improving SNR, increasing track density, increasing linear bit density, etc.

Figure 5A:
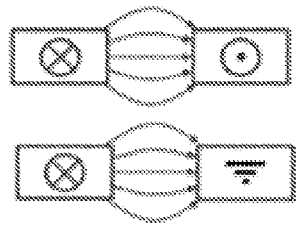
FIG. 5A shows examples of prior art differential edge-coupled transmission lines and single-ended edge-coupled transmission lines.
Figure 5B:
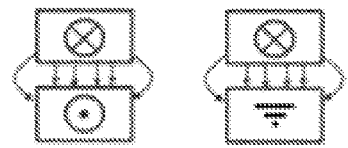
FIG. 5B shows examples of prior art differential stacked transmission lines and single-ended stacked transmission lines.
Figure 6A:
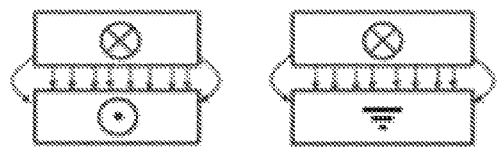
FIG. 6A shows an embodiment wherein the impedance of the transmission lines may be decreased by increasing a width of stacked transmission lines and/or by decreasing the spacing between stacked transmission lines.
Figure 6B:
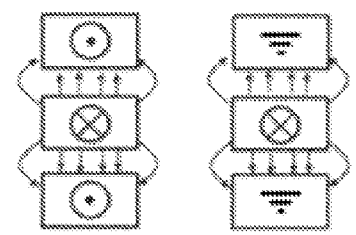
FIG. 6B shows an embodiment wherein the impedance of the transmission lines may be decreased by stacking the transmission lines in at least three layers.
Figure 6C:
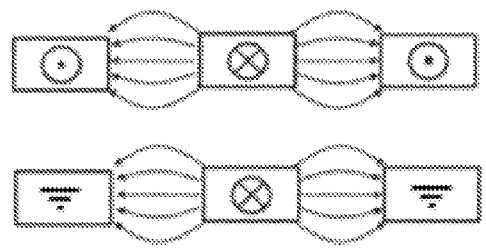
FIG. 6C shows an embodiment wherein the impedance of the transmission lines may be decreased by interlacing edged-coupled transmission lines.
Figure 6D:
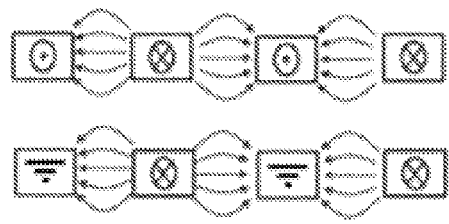
FIG. 6D shows an embodiment wherein the impedance of the transmission lines may be decreased by increasing the interlacing of edge-coupled transmission lines.
Figure 6E:
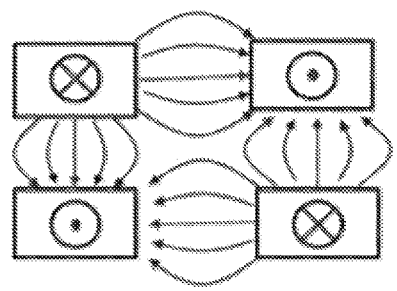
FIG. 6E shows an embodiment wherein the impedance of the transmission lines may be decreased by employing a quadrupole configuration.
Figure 6F:
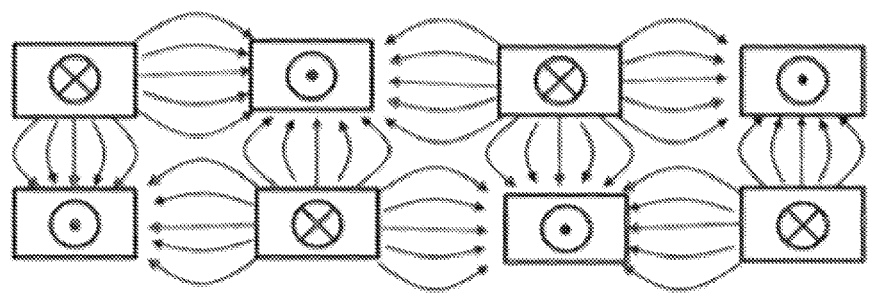
FIG. 6F shows an embodiment wherein the impedance of the transmission lines may be decreased by employing multiple interlaced quadrupole configurations.

FIG. 5A shows examples of prior art differential edge-coupled transmission lines and single-ended edge-coupled transmission lines, and FIG. 5B shows examples of prior art differential stacked transmission lines and single-ended stacked transmission lines. FIG. 6A shows an embodiment wherein the impedance of the transmission lines may be decreased by increasing a width of stacked transmission lines and/or by decreasing the spacing between stacked transmission lines (differential or single ended). FIG. 6B shows an embodiment wherein the impedance of the transmission lines may be decreased by stacking the transmission lines in at least three layers. For example, there may be a first polarity transmission line sandwiched between two second polarity transmission lines or sandwiched between two ground lines. FIG. 6C shows an embodiment wherein the impedance of the transmission lines may be decreased by interlacing edged-coupled transmission lines. For example, there may be a first polarity transmission line interlaced with two second polarity transmission lines or interlaced with two ground lines. FIG. 6D shows an embodiment wherein the impedance of the transmission lines may be decreased by increasing the interlacing of edge-coupled transmission line. FIG. 6E shows an embodiment wherein the impedance of the transmission lines may be decreased by employing a quadrupole configuration, and FIG. 6F shows an embodiment wherein the impedance of the transmission lines may be decreased by employing multiple interlaced quadrupole configurations.

In one embodiment (such as shown in FIG. 3) the laser driver 24 may comprise an impedance substantially equal to the impedance of the transmission line 22 which may improve performance and reduce cost, for example, by decreasing the required output power generated by the laser driver 24 in order to achieve the desired input power applied to the laser 20. Substantially matching the impedance of the laser driver 24 to the impedance of the transmission line 22 may also improve performance by reducing reflections and/or parasitic oscillations.

In the embodiment of FIG. 2D, the laser driver 24 may be pulsed at any suitable frequency. In one embodiment, the laser driver 24 may be pulsed at the data rate of the data written to the disk. That is, in one embodiment there may be one pulse per bit cell period. In other embodiments, the laser driver 24 may be pulsed at a higher or lower frequency. In addition, the laser driver 24 may be pulsed using any suitable duty cycle, including duty cycles of less than fifty percent and greater than fifty percent.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:
1. A disk drive comprising:
a disk;
a head comprising a laser configured to heat the disk while writing to the disk;
at least one transmission line coupling a laser driver to the laser; and control circuitry configured to write data to the disk by pulsing the laser driver, wherein the transmission line comprises an impedance that results in a target pulse shape of optical power output by the laser, wherein the impedance of the transmission line is less than forty ohms and at least ten percent greater than an impedance of the laser.

2. The disk drive as recited in claim 1, wherein the impedance of the transmission line is based on an amplitude of a current flowing through the laser when pulsing the laser.

3. The disk drive as recited in claim 1, wherein the target pulse shape reduces a heating degradation of at least one component in the head.

4. The disk drive as recited in claim 3, wherein the component comprises a near field transducer.

5. The disk drive as recited in claim 1, wherein:
the control circuitry is further configured to read the data from the disk to generate a read signal; and
the target pulse shape improves a signal-to-noise ratio of the read signal.

6. The disk drive as recited in claim 1, wherein a width of the target pulse shape increases a thermal gradient of the disk.

7. The disk drive as recited in claim 1, wherein the laser driver comprises an impedance substantially equal to the impedance of the transmission line.

8. The disk drive as recited in claim 1, wherein the at least one transmission line comprises a plurality of transmission lines including at least two transmission lines for transmitting a first polarity current and at least one transmission line for carrying a second polarity current opposite the first polarity.

9. The disk drive as recited in claim 1, wherein the at least one transmission line comprises a plurality of transmission lines including at least one transmission line for transmitting a first polarity current and at least two ground lines.

10. The disk drive as recited in claim 1, wherein the at least one transmission line comprises a plurality of transmission lines including at least two transmission lines for transmitting a first polarity current and at least two transmission lines for carrying a second polarity current opposite the first polarity.

11. The disk drive as recited in claim 10, wherein the at least two transmission lines for transmitting the first polarity current are interleaved with the at least two transmission lines for carrying the second polarity current.

12. The disk drive as recited in claim 10, wherein the plurality of transmission lines comprise at least one quadrupole configuration.

13. A method of operating a disk drive, the method comprising:
writing data to a disk by pulsing a laser driver coupled to a laser through a transmission line, wherein:
the laser is configured to heat the disk while writing the data to the disk; and
the transmission line comprises an impedance that results in a target pulse shape of optical power output by the laser,
wherein the impedance of the transmission line is less than forty ohms and at least ten percent greater than an impedance of the laser.

14. The method as recited in claim 13, wherein the impedance of the transmission line is based on an amplitude of a current flowing through the laser when pulsing the laser.

15. The method as recited in claim 13, wherein the target pulse shape reduces a heating degradation of at least one component in a head actuated over the disk.

16. The method as recited in claim 15, wherein the component comprises a near field transducer.

17. The method as recited in claim 13, wherein:
the method further comprises reading the data from the disk to generate a read signal; and
the target pulse shape improves a signal-to-noise ratio of the read signal.

18. The method as recited in claim 13, wherein a width of the target pulse shape increases a thermal gradient of the disk.

19. The method as recited in claim 13, wherein the laser driver comprises an impedance substantially equal to the impedance of the transmission line.

20. The method as recited in claim 13, wherein the at least one transmission line comprises a plurality of transmission lines including at least two transmission lines for transmitting a first polarity current and at least one transmission line for carrying a second polarity current opposite the first polarity.

21. The method as recited in claim 13, wherein the at least one transmission line comprises a plurality of transmission lines including at least one transmission line for transmitting a first polarity current and at least two ground lines.

22. The method as recited in claim 13, wherein the at least one transmission line comprises a plurality of transmission lines including at least two transmission lines for transmitting a first polarity current and at least two transmission lines for carrying a second polarity current opposite the first polarity.

23. The method as recited in claim 22, wherein the at least two transmission lines for transmitting the first polarity current are interleaved with the at least two transmission lines for carrying the second polarity current.

24. The method as recited in claim 22, wherein the plurality of transmission lines comprise at least one quadrupole configuration.

* * * * *